United States Patent
Fujikawa

[11] 3,877,991
[45] Apr. 15, 1975

[54] ELECTRIC AUTOMOBILE BATTERY GAS DISCHARGE TUBE CONNECTOR

[75] Inventor: Tadashi Fujikawa, Tokyo, Japan

[73] Assignee: Nissan Motor Company, Limited, Yokohama, Japan

[22] Filed: Jan. 29, 1974

[21] Appl. No.: 437,717

[30] Foreign Application Priority Data
Jan. 29, 1973 Japan.............................. 48-12604

[52] U.S. Cl. .............................................. 136/177
[51] Int. Cl. ............................................ H01m 1/06
[58] Field of Search .................................... 136/177

*Primary Examiner*—John H. Mack
*Assistant Examiner*—H. A. Feeley
*Attorney, Agent, or Firm*—Robert E. Burns; Emmanuel J. Lobato; Bruce L. Adams

[57] ABSTRACT

A discharge tube leads from the interior of a battery mounted within a casing which is detachably mounted within a battery compartment to a flange fixed to the casing. A connector body is fixed within the battery compartment and has an outlet vented to the atmosphere through an exhaust tube. A bellows carrying a resilient flange at its end extends from an inlet of the connector body. The resilient flange is biased by a spring into sealing engagement with the casing flange to provide connection between the discharge tube and the exhaust tube.

4 Claims, 3 Drawing Figures

ELECTRIC AUTOMOBILE BATTERY GAS DISCHARGE TUBE CONNECTOR

The invention relates to a connector for gas discharge tubing for a battery system of an electric automobile.

An electric vehicle conventionally employs lead storage batteries to provide energy to power the electric motor of the vehicle. When these batteries are charged, $H_2$ and $O_2$ gases are generated therewithin at low pressures which are potentially dangerous because their mixture will explode if ignited by a spark, etc. For this reason, lead storage batteries are provided with holes through their boxes to vent gases to the atmosphere formed during charging. A tube generally leads from the hole of each battery, and the tubes of adjacent batteries are often connected together to form a common discharge tube, which is connected to an exhaust tube opening to the atmosphere at a safe location on the automobile.

Several batteries are generally mounted in a common casing, which in turn is detachably mounted within a battery compartment located below the floor of the automobile for the sake of appearance. All of the batteries of the casing have discharge tubes leading to a common discharge tube, and during installation or replacement of a casing in the compartment, the common discharge tube must be connected to the exhaust tube. However, existing connectors for this purpose are generally inconvenient because they are generally of a screw type and must compensate for a certain amount of misalignment of the casing within the compartment, and vibrations in three dimensions. They are for this reason complicated in construction and expensive. Also, due to the relatively inaccessible location of the battery compartment below the automobile, negligence, ignorance and/or laziness, maintenance personnel or automobile owners frequently neglect to connect the common discharge tube to the exhaust tube during installation or replacement of a battery casing, with the subsequent danger of explosion.

It is therefore a primary object of the invention to provide a connector to connect a discharge tube to an exhaust tube of a battery system having a battery compartment and a battery casing carrying batteries, which provides automatic connection when the casing is installed in the compartment.

It is a further object of the invention to provide a connector which provides good sealing connection in spite of possible misalignment of the casing within the compartment and vibration in three dimensions imposed thereon.

It is a further object of the invention to provide a connector which is simple in construction and inexpensive to commercially manufacture.

The above and other objects, features and advantages of the invention will become more apparent from the following description taken in conjunction with the accompanying drawings, in which.

Figure 1:
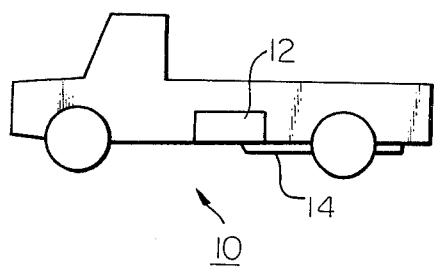
FIG. 1 is a schematic view of an electric automobile showing the location of a battery system thereof.

FIG. 1 shows an electric automobile having a battery system 10 which comprises a battery compartment 12 located under a floor portion of the automobile. An exhaust tube 14 opens from the interior of batteries mounted within the battery compartment 12 to the atmosphere at a safe location on the automobile as shown to vent gases generated during charging of the batteries to the atmosphere.

Figure 2:
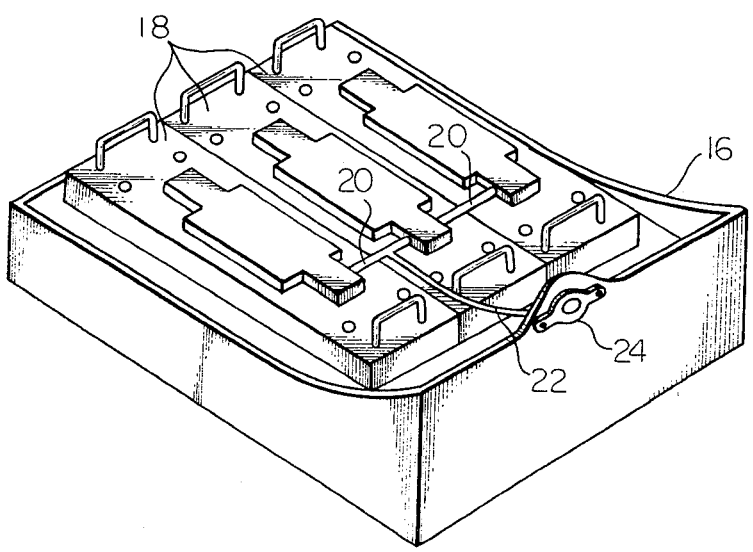
FIG. 2 is a perspective view of a battery casing to which the invention is applicable.

FIG. 2 shows a battery casing 16 to be detachably mounted within the battery compartment 12, which holds lead storage batteries 18. Tubes 20 communicate with the interiors of the batteries 18 and are commonly connected to a discharge tube 22, which in turn is connected to a casing flange 24 fixed to the casing 16.

Figure 3:
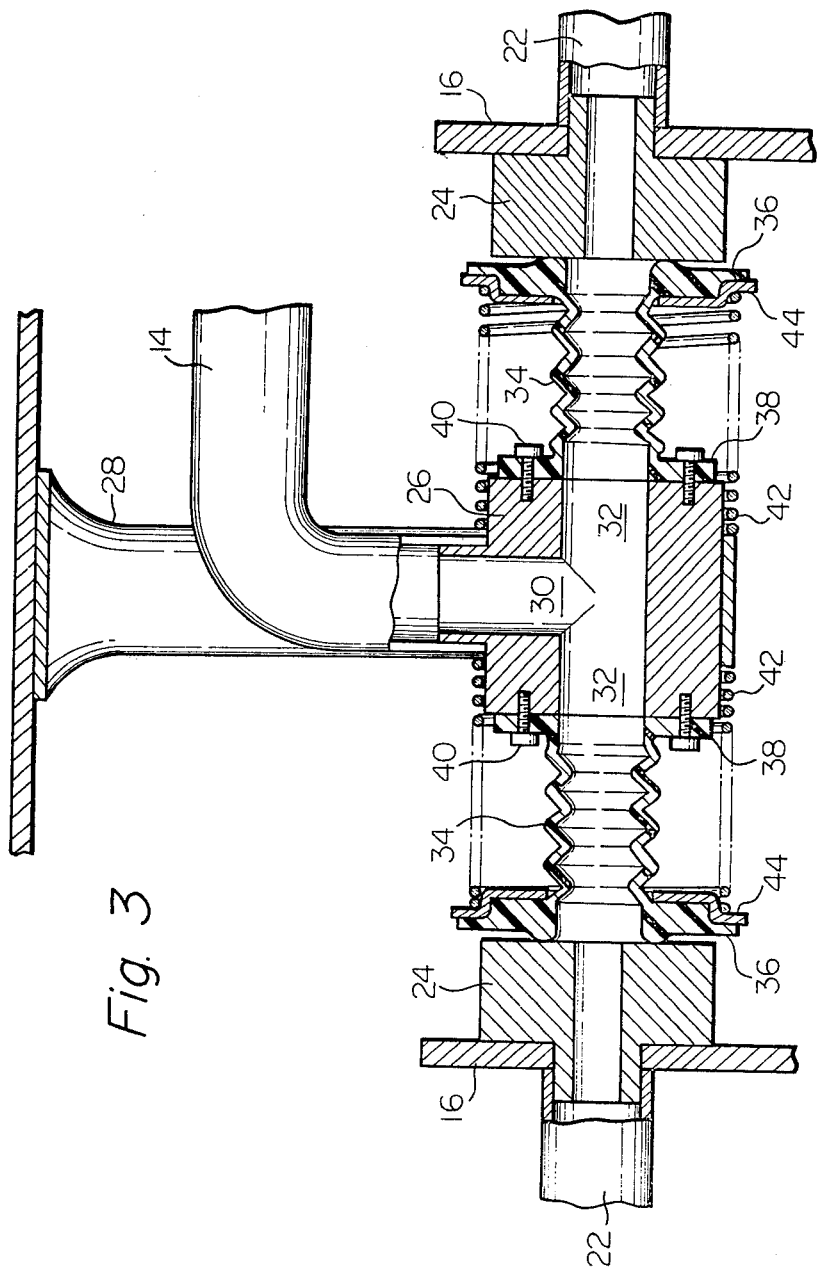
FIG. 3 is a longitudinal sectional view of a connector embodying the invention.

FIG. 3 shows a connector embodying the invention which comprises a connector body 26 which is fixedly mounted within the battery compartment 12 by a support 28, and has an outlet 30 communicating with the exhaust tube 14. The connector body 26 is shown as having two inlets 32 communicating with two discharge tubes 22 of two battery casings 16, through respective casing flanges 24. It is obvious that one skilled in the art can easily modify the embodiment of FIG. 3 to provide connection between the exhaust tube 14 and only one discharge tube 22, or can just as easily devise a connector to connect the exhaust tube 14 to more than two discharge tubes 22 within the scope of the invention.

As shown in FIG. 3, a flexible tube in the form of a bellows 34 extends externally from each inlet 32 and carries a resilient flange 36 at its end. The bellows 34 can be fixed to the connector body 26 by any convenient means such as a flange 38 and bolts 40. A biasing means such as a compression spring 42 urges each resilient flange 36 into sealing engagement with its respective casing flange 24. If desired, an annular spring retainer 44 may be fitted to each resilient flange 36 to evenly distribute the force applied thereto by the respective spring 42.

The connector body 26 and battery casings 16 are arranged to be mounted within the battery compartment 12 so that each inlet 32, bellows 34, resilient flange 36 and casing flange 24 is in respective axial alignment to provide optimum sealing between the resilient flanges 36 and the casing flanges 24, and thus leakage free connection between the discharge tubes 22 and the exhaust tube 14. However, due to the resilient biased connection between the resilient flanges 36 and the casing flanges 24, a connector within the scope of the invention is able to compensate for a significant amount of misalignment between the battery casings 16 and the connector body 26 when the casings 16 are installed in the battery compartment 12. In order to enhance this capability, the inner diameter of the resilient flanges 36 may be made larger than the inner diameter of the casing flanges 24. This biased resilient connection also enables a connector of the invention to absorb vibrations in three dimensions without losing its sealing efficiency.

Although not shown in the drawings, the connector body 26 is mounted within the battery compartment 12 so that when a battery casing 16 is inserted thereinto and slid into position, its casing flange 24 will automatically abut into sealing engagement with the corresponding resilient flange 36 without any supplementary connecting operation. Thus, the danger of explosion created by failure to connect the discharge tubes 22 to the exhaust tube 14 for the reasons enumerated hereinabove cannot occur, and examination of the drawings will clearly disclose that a connector of the invention is composed of a small number of readily available, inexpensive parts, and can easily be assembled on a large scale commercial basis using simple, existing production techniques.

What is claimed is:

1. A connector for a battery system having a battery compartment, a battery casing detachably mounted within the battery compartment, a battery mounted in the battery casing, a discharge tube communicating with the interior of the battery to pass gas therefrom, and an exhaust tube to pass gas from the discharge tube to the atmosphere, said connector being arranged to connect the discharge tube to the exhaust tube and comprising:

a connector body fixedly mounted within the battery compartment and having an outlet communicating with the exhaust tube and an inlet;

a flexible tube extending externally from said inlet of said connector body and having a resilient flange at its end;

biasing means urging said resilient flange externally from said connector body; and a casing flange fixed to the battery casing and communicating with the discharge tube;

the battery casing and said connector being arranged within the battery compartment so that said inlet, said flexible tube, said resilient flange and said casing flange are in substantial axial alignment and said resilient flange is urged into sealing engagement with said casing flange to provide connection between the discharge tube and the exhaust tube.

2. A connector as claimed in claim 1, in which the inner diameter of said resilient flange is larger than the inner diameter of said casing flange.

3. A connector as claimed in claim 2, in which said flexible tube is in the form of a bellows.

4. A connector as claimed in claim 3, in which said biasing means is a compression spring.

* * * * *